United States Patent Office 3,299,170
Patented Jan. 17, 1967

3,299,170
ALPHA PINENE COPOLYMER AS A TACKIFIER FOR POLYMERS
Carlos T. Gonzenbach, Scotia, N.Y., assignor to Schenectady Chemicals, Inc., Schenectady, N.Y., a corporation of New York
No Drawing. Filed Oct. 10, 1963, Ser. No. 315,379
6 Claims. (Cl. 260—846)

This invention relates to alpha pinene copolymers.

It has been proposed in the past to prepare polymers from alpha pinene. Such polymers, however, have relatively low melting points, e.g., 140° to 150° C. being the maximum melting point attainable for an alpha pinene homopolymer.

It is an object of the present invention to prepare novel alpha pinene copolymers having higher softening points than those customarily attained.

Another object is to prepare novel alpha pinene copolymers.

An additional object is to prepare novel high melting, solvent soluble, alpha pinene copolymers.

A further object is to prepare improved tackifying agents for hydrocarbon rubbers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by polymerizing 1 to 1.1 moles of alpha pinene with 1.1 to 1 moles of dicyclopentadiene or cyclopentadiene in the presence of a Friedel-Crafts catalyst. Yields of product in the order of 70 to 75% and higher are obtainable according to the invention.

The ratios of the reactants are critical. By using more of the alpha pinene there is obtained a resin having a lower softening point and the yields are reduced. By using more of the dicyclopentadiene there is obtained a more insoluble resin and the yields are also reduced.

The reaction is normally carried out in the presence of a Friedel-Crafts catalyst at 20° to 95° C. Thus, there can be used aluminum chloride, aluminum bromide, boron fluoride, boron fluoride etherate, aluminum iodide, ferric chloride, antimony trichloride, stannic chloride, titanium chloride or beryllium chloride. The preferred catalyst is aluminum chloride. Usually, 2 to 5% of catalyst is employed based on the total weight of reactive material. It has been noted that the use of 5% aluminum chloride gives a 15% better yield than 2.5% of aluminum chloride. Increasing the amount of aluminum chloride to 10% of the total monomers by weight does not further increase the yield and is more costly.

The reaction is normally carried out in the presence of an inert solvent such as benzene, hexane, cyclohexane, mineral spirits, aliphatic naphtha or petroleum ether. The amount of solvent is not critical.

It is essential that the alpha pinene be reacted with the dicyclopentadiene. Merely mixing a preformed alpha pinene resin with a preformed dicyclopentadiene resin does not give the results of the present invention.

The reaction is stopped by adding water, preferably containing a nonionic detergent, as is customary in Friedel-Crafts reactions. The product is then purified by contacting it with a sequestering agent, as shown in Braidwood Patent 2,814,610, the entire disclosure of which is incorporated herein, and then by a plain water wash.

The thus-purified product is then sparged with nitrogen gas up to a 250° C. pot temperature. Then, a superheated steam sparge is employed up to 260° C. until the copolymer produced has a softening point of 170° to 205° C.

It has been found that by varying the alpha pinene to dicyclopentadiene molar ratio the following results are obtainable. The softening points were obtained by the ball and ring method, ASTM No. E-28.

| Moles alpha pinene | Moles dicyclopentadiene | Polymer S.P., ° C. |
| --- | --- | --- |
| 1.1 | 1 | 185 |
| 1 | 1 | 190 |
| 1 | 1.1 | 205 |

The alpha pinene copolymers produced are useful in the rubber tire industry to make splicing cements and as adhesives for shoe manufacture and as adhesives in general. The resin having a softening point of 190° C. is particularly useful as a rubber tackifier, especially for butyl rubber.

Example 1

10 moles of alpha pinene and 10 moles of dicyclopentadiene and 20 moles of benzene were put in a round bottom 3-necked reaction flask fitted with a thermometer, a water-cooled condenser and a mechanical stirrer. While actively stirring, 2.5% (based on the total of the pinene and the dicyclopentadiene) aluminum chloride was gradually added at 30 to 35° C. The reaction was allowed to continue for a total time of 2 hours. The reaction was stopped by adding water containing 0.06% of Triton 102 (a nonionic detergent which is an octylphenol-ethylene oxide adduct). Next, the product was washed with 1% of citric acid in water and then with plain water. The product was then sparged with nitrogen up to a pot temperature of 250° C. Superheated steam was then substituted for the nitrogen until a pot temperature of 260° C. was reached. The alpha pinene-dicyclopentadiene copolymer product had a softening point of 190° C. and was obtained in a yield of 75%. In other runs yields of 70 to 75% were obtained.

Unless otherwise indicated all parts and percentages in the specification and claims are by weight.

Example 2

The procedure of Example 1 was repeated but the amount of aluminum chloride was increased to 5%. The yield of copolymer having a melting point of 190° C. was about 90%.

Example 3

The procedure of Example 1 was repeated but using 1.1 moles of alpha pinene and 1 mole of dicyclopentadiene. The product had a melting point of 185° C.

Example 4

The procedure of Example 1 was repeated but using 1 mole of alpha pinene and 1.1 moles of dicyclopentadiene. The product had a melting point of 205° C.

The resins of the present invention are particularly valuable in tackifying butyl rubber and styrene-butadiene copolymer.

Typical examples of materials classified as butyl rubber are set forth in Thomas Patent 2,356,128 and Fusco Patent 3,093,613. The butyl rubber is an isoolefin-multiolefin copolymer containing 0.5 to 15% of combined multiolefin. Usually, the butyl rubber is a copolymer of 85 to 99.5% of a $C_4$ to $C_7$ isoolefin and 0.5 to 15% of a $C_4$ to C₁₄ multiolefin. Typical examples of suitable isoolefins are isobutylene, isoamylene, isohexylene. Typical examples of preferred multiolefins are conjugated diolefins such as isoprene, butadiene, dimethyl butadiene, piperylene. The most preferred butyl rubber is an isobutylene-isoprene copolymer. A typical isobutylene-isoprene copolymer is GRI-17 which has an average molecular weight of 410,000, a 1.5 mole percent unsaturation and a Mooney viscosity at 212° F. of 66.

The styrene-butadiene copolymers can be resinous, e.g., 80% styrene-20% butadiene; 60% styrene-40% butadiene or rubbery, e.g., 40% styrene-60% butadiene; 25% styrene-75% butadiene. In place of butadiene other diolefins can be used, e.g., isoprene and dimethyl butadiene. In place of styrene there can be used vinyl toluenes, e.g., o-methyl styrene and p-methyl styrene, or alpha methyl styrene.

While the alpha pinene-dicyclopentadiene (or cyclopentadiene) resins of the present invention are useful as tackifying agents by themselves they have an open time limit for use of not over 24 hours. It has been found that this open time limit can be increased to 48 to 72 hours by incorporating a novolak with the alpha pinene-dicyclopentadiene copolymer. Normally, the ratio of the hydrocarbon resin to the novolak can range from 1:1 up to 4:1 with 3:1 being the preferred ratio.

As the novolak there can be employed alkylphenol-formaldehyde resins containing 4 to 12 carbon atoms in the alkyl group. Typical examples of novolaks are o-butylphenol-formaldehyde, p-butylphenol-formaldehyde, o-amylphenol-formaldehyde, p-amylphenol-formaldehyde, p-hexylphenol-formaldehyde, o-cyclohexylphenol-formaldehyde, p-octylphenol-formaldehyde, o-octylphenol-formaldehyde, o-nonylphenol-formaldehyde, p-nonylphenol-formaldehyde and p-dodecylphenol-formaldehyde.

Example 5

3 parts of the alpha pinene-dicyclopentadiene copolymer resin having a softening point of 190° C. prepared in Example 1 was mixed with 1 part of a p-octylphenol-formaldehyde novolak. The mixture was dissolved in 96 parts of n-hexane and applied to the surface of the rubber.

Example 6

10 parts of the mixture of resins prepared in Example 5 were added to 100 parts of GRI-17 butyl rubber to tackify the rubber.

Generally, 10 to 50 parts of this mixture of resins can be used per 100 parts of butyl rubber or styrene-butadiene copolymer.

Example 7

10 parts of the alpha pinene-dicyclopentadiene copolymer prepared in Example 1 were added to 100 parts of GRI-17 butyl rubber in order to tackify the rubber.

What is claimed is:

1. A mixture of (1) a copolymer of 1 to 1.1 moles of alpha pinene and 1.1 to 1 moles of a member of the group consisting of cyclopentadiene and dicyclopentadiene with (2) a member of the group consisting of a copolymer of 85 to 99.5% of an isoolefin and 0.5 to 15% of a multi-olefin and copolymer of a conjugated open chain diolefin with a member of the group consisting of styrene, ring-substituted methyl styrene and alpha methyl styrene, said pinene copolymer being present in an amount sufficient to tackify said member (2).

2. A mixture of isobutylene-isoprene copolymer containing 85 to 99.5% isobutylene and 0.5 to 15% isoprene and as a tackifying agent therefor a minor amount of a copolymer of 1 to 1.1 moles of alpha pinene and 1.1 to 1 moles of dicyclopentadiene.

3. A mixture according to claim 2 including an alkylphenol-formaldehyde novolak containing 4 to 12 carbon atoms in the alkyl group.

4. A mixture according to claim 3 wherein there are used 1 to 4 parts of the copolymer per part of novolak.

5. A mixture according to claim 4 wherein the novolak is p-octylphenol-formaldehyde novolak.

6. A mixture according to claim 1 containing 10 to 50 parts of said pinene copolymer per 100 parts of said member (2).

References Cited by the Examiner

UNITED STATES PATENTS

| | | | |
|---|---|---|---|
| 2,348,565 | 5/1944 | Ott | 260—82.1 |
| 2,373,706 | 4/1945 | Ott | 260—93.3 |
| 2,476,824 | 7/1949 | Albert | 260—845 |
| 2,987,420 | 6/1961 | Bemmels et al. | 260—845 |
| 3,058,930 | 10/1962 | Samour | 260—88.2 |

MURRAY TILLMAN, *Primary Examiner.*

J. C. BLEUTGE, *Assistant Examiner.*